(No Model.)

A. W. BREWTNALL.
SUSPENDING AND CIRCUIT CONTROLLING MECHANISM FOR ELECTROLIERS.

No. 284,805. Patented Sept. 11, 1883.

Witnesses:
Solon C. Kemon
H. B. Brown

Inventor:
A. W. Brewtnall
By Munn & Co.
Attorneys

UNITED STATES PATENT OFFICE.

ARTHUR W. BREWTNALL, OF WESTMINSTER, ENGLAND.

SUSPENDING AND CIRCUIT-CONTROLLING MECHANISM FOR ELECTROLIERS.

SPECIFICATION forming part of Letters Patent No. 284,805, dated September 11, 1883.

Application filed May 4, 1883. (No model.) Patented in England June 20, 1882, No. 2,914, and in France December 20, 1882, No. 152,772.

*To all whom it may concern:*

Be it known that I, ARTHUR WILFRED BREWTNALL, of the city of Westminster, England, have invented Improved Means of Suspending or Mounting Electroliers and other Electric-Light Fittings, of which the following is a full, clear and exact description.

This invention has for its object to enable the principle of the ball-and-socket joint to be applied to the suspension of electroliers, and to the mounting of other swinging or movable fittings for the electric light, by providing through the medium of the said joint for the maintenance, unbroken, of the electrical circuit when the electrolier or other fitting is swung or rotated.

My invention consists in constructing the ball and likewise its socket in segments, zones, or other parts of metal, separated from one another by segments, zones, or parts of insulating material, the metallic segments or portions of the socket corresponding to similer segments or portions of the ball and in contact therewith over a sufficient extent of surface to permit of the free motion of the ball in its socket without breaking the electrical connection between the corresponding segments or parts.

Figure 1:
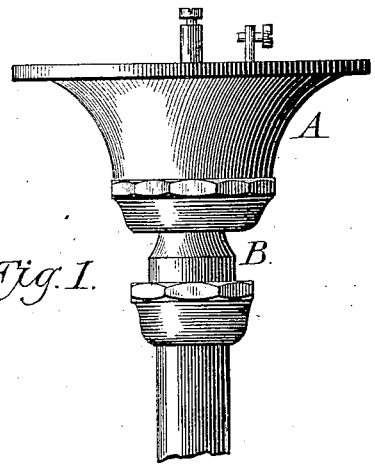
Figure 2:
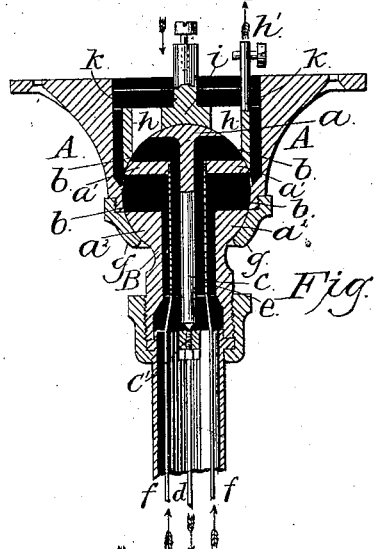
Figure 3:
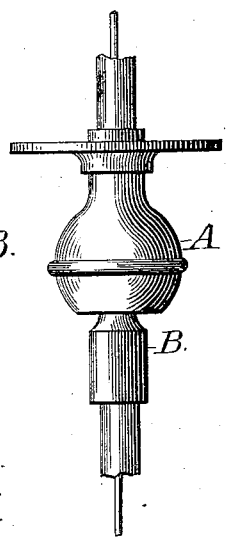
Figure 4:
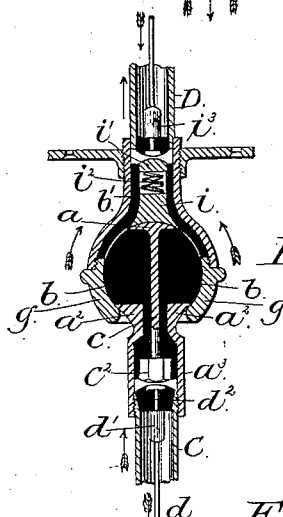
Figure 5:
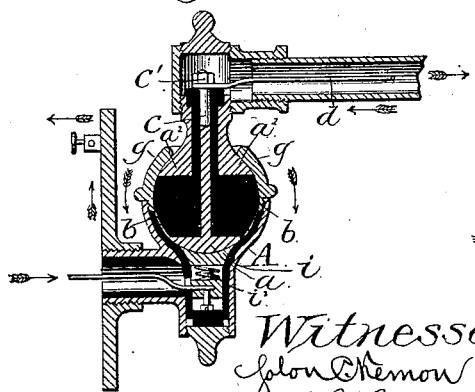
Figure 6:
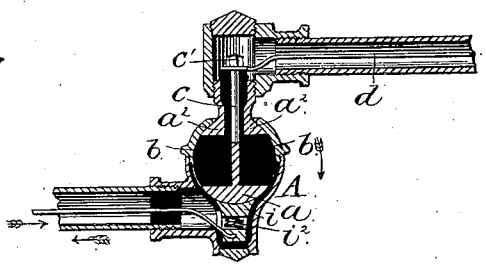

My invention is illustrated in the accompanying drawings, in which Figure 1 is an elevation, and Fig. 2 a central vertical section, of one arrangement of ball and socket for the suspension of an electrolier. In this arrangement the ball and socket are constructed of a sufficient number of zones or segments to afford a return-circuit without using for this purpose the external metal of any part. Figs. 3 and 4 are similar views of a ball and socket in which the external metal is used for the return-circuit. Figs. 5 and 6 respectively show the application of my ball-and-socket joint to the first and intermediate joints of wall-brackets. In these figures the arrangement is similar to Fig. 4; but the arrangement shown in Fig. 2 might equally well be employed if it is not desired to use the external metal for the return-circuit.

In all these figures the same letters of reference indicate corresponding parts.

A is the socket, and B is the ball. In Fig. 2 the ball is composed of three horizontal metallic segments, $a$ $a'$ $a^2$, separated from one another by two insulating-segments, $b$. The segment $a$ is attached to a central stem, $c$, which leads through the neck of the ball, and is connected by a nut, $c'$, to the wire $d$, leading to the lamp. To the intermediate metallic zone or segment, $a'$, is soldered a metal tube, $e$, which also leads through the neck of the ball and terminates in tangs to which are connected the return-wires $f$ from the lamp. The segments $b$ of insulating material are also carried through the neck of the ball and surround the rod $c$ and tube $e$, and insulate them from one another and from the third segment, $a^2$. This third or lowest segment takes the wear and rests in the corresponding gland, $g$, of the socket A. This third segment, $a^2$, serves for the attachment of the main stem of the electrolier in the ordinary way. This socket contains an annular metallic lining, $h$, which exactly coincides with the zone or segment $a'$ of the ball, and is insulated from the outer portion of the socket, as shown. To this lining $h$ the return-wire is connected at $h'$. $i$ is a central stud having its lower surface concaved to the radius of the ball, so as to make good contact with the uppermost segment, $a$, of the ball. To this stud the positive wire from the generator is attached, and the stud is insulated by a disk of vulcanite, and is pressed into contact with the segment $a$ of the ball by a disk of soft india-rubber, $k$, beneath the vulcanite and bearing upon a shoulder of the stud. This india-rubber disk $k$ also bears at its edges upon the annular lining $h$ and presses it likewise into contact with the segment $a'$. Thus it will be seen that there is perfect freedom for complete rotation, and also for oscillation to any desired extent, of the ball in the socket without liability of breaking the electrical connection.

In Fig. 4 there are only two metal segments, $a$ and $a^2$, separated by a segment, $b$, of insulating material, as shown. The segment $a$ is attached to a central stem, $c$, as before; but the stem terminates in a nut, $c^2$, screwed on it, this nut being a sufficient distance within the socket $a^3$ of the part $a^2$ to enable the joint to be made as next described. $d$ is the leading-wire, fixed at its upper end into a stud, $d'$, embedded in a plug, $d^2$, of insulating material, filled into a coned seat in the end of the main stem C of the electrolier, from which the stud $d'$ projects slightly, so that when stem C is screwed into its socket $a^3$ electrical connection will be made between $c$ and $d$. The concave stud $i$, which presses on the segment $a$ of the ball, is divided into two parts, $i\ i$, connected by a metal spring, $i^2$, which answers the purpose of the india-rubber disk $k$ in Fig. 2. The joint of the leading-wire from the positive pole of the generator is made by an insulated stud, $i^3$, pressed against $i'$ in the act of screwing the tube D (which incloses said wire) to the socket A. In this arrangement it will be seen by the arrows that tube C, segment $a^2$ of the ball, gland $g$, socket A, and tube D serve as the return-conductor. In this case the stud $i$ and segment $a$ are insulated from the socket A by a lining, $b'$, of vulcanite or other insulating material. The tube D may be replaced, when desired, by a terminal. Figs. 5 and 6 show the application of the same joint to the joints of wall-brackets. The essential parts of the joint, being identical with those before described, need no further description, and the slight modification necessary in the bracket itself to adapt it to receive these joints will be apparent from the drawings without special explanation.

Having described the nature of the said invention, and the manner of performing the same, I declare that I claim—

1. The combination, with a socket having a spring-pressed central stud insulated therefrom, of a ball composed of segments or zones insulated from each other, and one of which segments or zones is provided with a central stem projecting through the ball and insulated therefrom, substantially as described.

2. The combination, with the socket A $g$, provided with the insulated lining $h$ and the insulated and spring-pressed stud $i$, of the ball B, composed of the segments or zones $a\ a'\ a^2$, the central stem, $c$, secured to the segment $a$, the tube $e$, secured to the segment $a'$, and the insulating material $b\ b$, projecting down into the neck of the ball, substantially as shown and described.

The foregoing specification of my improved means for suspending or mounting electroliers and other electric-light fittings signed by me this 14th day of March, 1883.

ARTHUR WILFRED BREWTNALL.

Witnesses:
   WM. CLARK,
     53 *Chancery Lane, London, Patent Agent.*
   F. W. KENNARD,
     53 *Chancery Lane, London, Clerk.*